(12) United States Patent
Marohn

(10) Patent No.: US 7,226,662 B2
(45) Date of Patent: Jun. 5, 2007

(54) CONCRETE SUBSTRATE CONTAINING GLASS

(76) Inventor: Heinz Marohn, Kliedbruchstr. 51, D-47803 Krefeld (DE)

( * ) Notice: Subject to any disclaimer, the term of this patent is extended or adjusted under 35 U.S.C. 154(b) by 0 days.

(21) Appl. No.: 10/473,378

(22) PCT Filed: Mar. 25, 2002

(86) PCT No.: PCT/DE02/01068

§ 371 (c)(1),
(2), (4) Date: Sep. 26, 2003

(87) PCT Pub. No.: WO02/076904

PCT Pub. Date: Oct. 3, 2002

(65) Prior Publication Data

US 2004/0091698 A1    May 13, 2004

(30) Foreign Application Priority Data

Mar. 27, 2001  (DE) ................................ 101 15 158

(51) Int. Cl.
*B32B 5/16* (2006.01)
*B05D 3/10* (2006.01)
(52) U.S. Cl. .................... 428/407; 428/404; 428/405; 427/219; 427/221; 427/301
(58) Field of Classification Search ............... 428/404, 428/405, 406, 407, 331, 327; 427/219, 221, 427/301
See application file for complete search history.

(56) References Cited

U.S. PATENT DOCUMENTS

| 3,760,880 | A | * | 9/1973 | Dollarhide | 166/276 |
|---|---|---|---|---|---|
| 3,867,986 | A | * | 2/1975 | Copeland | 166/276 |
| 3,922,413 | A | * | 11/1975 | Reineman | 428/119 |
| 3,935,339 | A | * | 1/1976 | Cooke, Jr. | 427/216 |
| 4,210,687 | A | * | 7/1980 | Obendorf et al. | 428/34.7 |
| 4,254,010 | A | * | 3/1981 | Mizuno et al. | 523/213 |
| 4,256,788 | A | * | 3/1981 | Gras | 428/34.7 |
| 4,305,863 | A | * | 12/1981 | Adachi et al. | 523/214 |
| 4,639,476 | A | * | 1/1987 | Tajiri et al. | 523/213 |
| 4,785,884 | A | * | 11/1988 | Armbruster | 166/280.2 |
| 4,888,240 | A | * | 12/1989 | Graham et al. | 428/403 |
| 5,069,971 | A | * | 12/1991 | Waketa et al. | 428/391 |
| 5,182,173 | A | * | 1/1993 | Swei | 428/391 |
| 5,422,183 | A | * | 6/1995 | Sinclair et al. | 428/403 |
| 5,425,994 | A | * | 6/1995 | Harry et al. | 428/403 |
| 6,632,527 | B1 | * | 10/2003 | McDaniel et al. | 428/402 |

FOREIGN PATENT DOCUMENTS

| DE | 2001171 A | * 1/1976 |
|---|---|---|
| DE | 41 20 764 C1 | 6/1992 |
| FR | 2307092 | * 12/1976 |

* cited by examiner

*Primary Examiner*—H. Thi Le
(74) *Attorney, Agent, or Firm*—Akerman Senterfitt

(57) ABSTRACT

The invention relates to a construction-material body or coating, containing a hydraulic agglutinant, aggregate material and glass granulate as the principal components. The surface of said glass granulate is coated with a protective layer, which contains at least one organic silicon compound and/or at least one duroplastic.

17 Claims, No Drawings

CONCRETE SUBSTRATE CONTAINING GLASS

The invention relates to a concrete substrate containing a hydraulic agglutinant, aggregate material and glass granulate as the principal components.

It is known to add glass granulate made of special glass or silicate glasses to aggregate materials as decorative effect elements, following a metal coating for reflection, which aggregate materials are mostly inorganically agglutinated. Another common practice is to agglutinate glass granulates of different origin with reactive resins in order to manufacture, for example, plates and boards for coatings and sheetings therefrom.

A drawback of the use of glass granulate, particularly if made of silicate glass, as an aggregate material and decorative effect element is its low breaking strength after being comminuted and its low alkali resistivity which causes decay and/or puff-out effects in inorganically agglutinated materials.

The low breaking strength of glass granulate made of common alkali silicate glass is due to tiny micro-cracks occurring during the manufacturing process. These micro-cracks are potential breaking points in the micrometer range and in case of mechanical stress easily cause a breaking ("disintegration") of the individual glass particles. This existing instability of the glass granulate may increase when water condenses into the micro-cracks thus enabling a spreading of the cracks into the individual glass granules. Further, the occurrence of cracks causes the formation of sharp edges which may cause injuries.

Due to the mechanical instability and low breaking strength of glass granulate, it cannot be used as a construction or working material in areas involving increased requirements with regard to safety and mechanical strength. This applies particularly to floor coatings.

Another drawback of glass granulate made of common alkali silicate glass is its low resistivity to alkaline solutions which dissolve away the silicon dioxide contained in the glass. This means a severe limitation of the use of glass granulate as an aggregate material in hydraulically agglutinated materials. Due to the overall alkaline environment in concrete existing on the interfaces between glass and concrete, the glass granule surface is attacked and dissolved causing a disadvantageous occurrence of cracks and tension in the concrete or even a dissolving-away of individual glass particles being located on the surface of a coating containing concrete, especially a floor coating.

DE 41 20 764 AI describes a concrete-containing coating consisting of a mixture of cement, aggregate materials and granulated effect elements made of glass being coated with metal for reflection in a high vacuum.

Resin-based floor coatings containing glass granulate made of specifically hardened "Moreno" glass are known as well. Having a Mohs' hardness of approximately 7.0, this glass has a sufficient breaking strength and hence is suitable for use in floor coatings. A disadvantage of this specific glass is its high manufacturing cost.

It is further known to provide window or car glass panes with a silane coating to improve their adhesiveness to plastic or metal materials. This process is generally referred to as silanisation.

The object of the present invention is to provide a construction-material body or coating containing a hydraulic agglutinant, aggregate materials and glass granulate as principal components and which is characterised by a high breaking strength, excellent mechanical strength, and a high alkaline resistivity.

According to the present invention, this object is achieved by a construction-material body or coating containing a hydraulic agglutinant, aggregate materials and glass granulate as principal components, wherein the surface of the glass granulate is coated with a protective layer containing at least one organic silicon compound and/or at least one duroplastic material.

The surface coating of the glass granulate with an organic silicon compound and a duroplastic material considerably increases the breaking strength of the granulate and effectively seals any micro-cracks, thus preventing the breaking-apart of individual glass granules. The specific protective layer ensures that the glass granulate according to the present invention has a uniform Mohs' hardness of approximately 6 and thus a high mechanical strength and low splinter formation. Further, the glass granulate according to the present invention has a considerably improved alkaline resistivity compared to common alkali silicate glass. Even after having included the granulate in concrete for several months, no change of the surface of the glass granulate according to the present invention caused by alkali was observed.

The protective layer compensates for the different mechanical utility levels of glasses of different origin and composition, thus creating uniform prerequisites for their further processing and finishing.

The protective layer may comprise one or several layers. This means that the organic silicon compound and the duroplastic material are provided in one common layer or in separate layers.

Preferably, the organic silicon compound used is a compound having the general formula $$Y-(CH_2)_n-SiX_3$$

wherein X is a halogen atom such as fluorine, chlorine, bromine and iodine or an alkoxy group comprising 1 to 20 carbon atoms, Y is an amino, carboxy, cyano, methacryloxy, epoxy, mercapto or an alkyl, aryl or aralkyl-substituted vinyl group, and n is a number from 0 to 30, particularly from 0 to 10.

Such organo-functional silanes are known as adhesion mediators. In the present invention, they act on the one hand as adhesion mediators to ensure a secure bonding between the glass and the duroplastic material. On the other hand, in combination with duroplastic material they serve as alkali-resistant, pore-closing substance which permanently seals even the tiniest micro-cracks in the glass.

The production and the properties of organic silicon compounds usable according to the present invention are described, for example, in "*Ullmanns Enzyklopädie der Technischen Chemie*" (Ullmann's Encyclopedia of Technical Chemistry) (4$^{th}$ edition), vol. 21, pp. 498–499.

Suitable duroplastic materials according to the present invention include all plastic materials made of hardenable resins such as epoxy resins, unsaturated polyester resins, diallylphthalate resins, urea-formaldehyde resins, melamine-formaldehyde resins, melamine-phenol-formaldehyde resins, polyurethanes, pre-polymers and phenol-formaldehyde resins. Preferably, epoxy resins, in particular those based on bisphenol-A and/or bisphenol A/F resins, are used.

Preferably, the duroplastic materials used in the coating according to the present invention comply with the standards laid down in DIN 7724 (insert 2/1972).

The duroplastic materials may be used in any form, for example as moulded plastic, cast resins, glue resins or resins for lacquers and varnishes. Preferably, duroplastic material in the form of varnishes is used.

The production and the properties of duroplastic materials are widely known and described, for example, in Bauer, Woebcken: "*Verarbeitung duroplastischer Formmassen*" (The Processing of Duroplastic Moulded Plastic), Munich, Hanser publishing house, 1973; "*Physik der Duroplaste und anderer Polymere*" (The Physics of Duroplastic Materials and Other Polymers), Darmstadt, Steinkopf, 1978; Saechtling: "*Kunststoff-Taschenbuch*" (Paperback of Plastics), $23^{rd}$ edition: pp. 2–5, pp.378–443, Munich, Hanser publishing house, 1986; "*Ullmanns Enzyklopädie der technischen Chemie*" (Ullmann's Encyclopedia of Technical Chemistry) ($4^{th}$ edition) 15, 309–335, 477–481; and Woebcken: "*Duroplaste, Kunststoff-Handbuch*" (Duroplastic Materials, Paperback of Plastics), $2^{nd}$ edition, vol. 10, Munich-Vienna, Hanser publishing house, 1988.

The surface encapsulation may be performed, for example, by applying an organic or aqueous solution of the organic silicon compound onto the glass surface, followed by a second coating with varnish made of duroplastic resin.

Depending upon the intended use of the granulate, the simultaneous use of the silane component may be omitted.

The method may be applied to cold glass as well as to tempered glass granulate.

Now, the coating of the glass granulate will be described by way of example:

Step 1: Pre-Treatment of the Glass Granulate with Silane
  Possible forms of silane use:
  a) pure
  b) in an aqueous medium
  c) in a solvent
  Re b): Preferably, the silane is dissolved in water or in a mixture of water and a solvent (e.g. alcohol) using acid or alkaline catalytic hydrolysis.
  Effective concentration of the silane:
  0–10 wt. %, preferably 0.1–5.0 wt. %
  Re c): The silane is dissolved, for example, in alcohols, ketones, esters or hydrocarbons.
  Effective concentration of the silane:
  0–20 wt. %, preferably: 1–5 wt. %
  Silane application: The silane (in the variations a to c) may be applied onto the glass granulate by spraying, pouring, dripping, combined with intensive mixing (pan-grinding) in a compulsory mixer.
  The sufficient mixing/pan-grinding process is followed by a drying process which is finished when the glass granulate shows no stickiness and does not react with test chemicals.

Step 2: Coating of the Silane-Pretreated Glass Granulate with Duroplastic Materials
  Preferably, the following duroplastic systems are suitable for coating the silane-pretreated glass granulate:
  a) 2-component epoxy:
    Hardening by mixing of epoxy resin (component A) and amine hardener (component B).
    Action: The components A and B are externally premixed at room temperature and added to the glass granulate under extensive mixing. The coating process is finished when the glass granulate shows no stickiness.
  b) 2-component and/or 1-component urethane:
    Hardening by mixing of polyol and diisocyanate or coating with prepolymeric isocyanate.
    Action: as in a)
  c) Acrylates:
    Hardening by mixing of acrylate resin (component A) and a radical hardener (component B) or hardening by UV irradiation (without radical hardener).
    Action: In case of acrylate/radical hardener: as in a). In case of UV hardening: The acrylate is added to the glass granulate under intensive stirring (at room temperature). After having achieved a homogeneous distribution of the acrylate, the glass granulate is irradiated with UV light while being intensively mixed. The process is finished when the glass granulate shows no stickiness.
  d) Polyester:
    Hardening by of mixing polyester resin and a radical hardener or by UV irradiation.
    Action: as in c)

Achievable layer thicknesses d: Depending upon the grain size of the glass granulate and the quantity or the duroplastic system added:

$$d = \text{up to } 200 \, \mu m$$

Likewise, a mixture of an organic silicon compound and a duroplastic resin in an appropriate solvent may be prepared and then be applied onto the glass surface.

Preferably, the quantity of silane to be added to the duroplastic system ranges between 1 and 10 wt. %.

The coating action is performed as described above (steps 2 a–d).

Preferably, the organic silicon compound and the duroplastic material are matched with each other. Particularly preferred combinations of organic silicon compound (A) of the general formula $Y-(CH_2)_n SiX_3$, wherein Y, n and X have the meanings specified above, and duroplastic material (B) are specified below:
  Silicon compound A with Y=amino, epoxy, mercapto group in combination with an epoxy resin matrix as duroplastic material (B)
  Silicon compound A with Y=acrylate, methacrylate, vinyl group in combination with a polyester matrix, acrylate matrix and/or vinyl ester matrix as duroplastic material (B).
  Silicon compound A with Y=amino, epoxy, mercapto group in combination with a urethane and/or isocyanate matrix as duroplastic material (B).

This ensures a particularly durable, irreversible adhesion between the glass surface and the protective layer.

In a preferred embodiment of the invention, the outer surface of the coating is given a good grip to improve the adhesion of later agglutinants or mechanical mixtures.

Granulates of any glass type such as soda-lime-silicate glass, borosilicate glass, quartz glass, technical glass, window glass, bottle glass, opal glass, industrial glass, coloured glass, crystal glass, fibreglass, foamed glass, composite glass, crown glass or optical flint in any colour or mixtures thereof may be used as glass granulate.

The term "glass" as used in the present invention generally refers to inorganic substances in an amorphous, non-crystalline solid state.

The purity and composition of the glass granulate used according to the present invention is of no importance; it is, however, an essential aspect of the invention that glass granulate of any type can be provided with a uniform high breaking strength and alkali resistivity by silanisation and coating with a duroplastic material according to the present invention. Therefore, cheap recycling glass may be used as well.

Preferably, clear glass is used.

Preferably, the glass granules have a diameter ranging from 0.5 to 64 mm, in particular from 1 to 32 mm.

The production, compositions and properties of the individual glass types are widely known and described, for example, in "Kirk-Othmer" ($3^{rd}$ edition) vol. 11, pp. 807–880; "Ullmanns Enzyklopädie der technischen Chemie" (Ullmann's Encyclopedia of Technical Chemistry) ($4^{th}$ edition) vol. 12, pp. 317–366.

If the glass granulate according to the preferred embodiment consists of clear glass, special optical effects can be achieved by a coloured protective layer. The protective layer may be coloured by adding a suitable dye to the organic silicon compound or to the duroplastic material. Suitable dyes are pigment powder and pastes of organic and inorganic origin.

The colouring described above creates the optical impression of "thoroughly coloured" transparent glass. This impression is maintained even if the coloured protective layer is worn off in some areas of the surface of the glass granulate. In this case, the colour of the remaining areas coated with the coloured protective layer shines through, thus creating the impression that the entire glass particle is thoroughly coloured. This means that even after grinding-off or sandblasting in some areas the glass granulate which has been provided with an appropriately coloured protective layer according to the invention, creates the impression of uniformly and thoroughly coloured glass. Compared to thoroughly coloured glass granulate, the glass granulate coated with a coloured protective layer has the advantage of being considerably cheaper.

Due to its high breaking strength and excellent alkali resistivity, the glass granulate is a suitable aggregate material in construction-material bodies or coatings.

In particular, the glass granulate is suitable for use in mineralically/inorganically agglutinated construction-material bodies or coatings.

The construction-material body or coating according to the present invention may for example be manufactured as follows:

preparation of a mixture of cement, aggregate materials and, if appropriate, further agglutinants and additives with water, application of the mixture onto a surface or into a mould, insertion of surface-coated glass particles into the mixture, and curing the mixture to form a body or coating.

According to a preferred embodiment of the present invention, the coating of the glass granulate is removed at least in part in the exposed surface areas of the body or coating. This may be performed, for example, by grinding or sandblasting at least one visible side of the body or coating. Especially in cases where the glass granulate consists of clear glass having a coloured coating, the grinding-off creates a particularly attractive optical effect.

In the manufacturing of floor coatings, it has proved particularly advantageous to apply the concrete onto the floor at first followed by scattering the glass granulate into its surface before hardening. After hardening, the floor coating may be ground to level by means of an appropriate grinding device.

Depending upon the intended properties, the quantity of glass granulate contained in the construction-material body or coating according to the present invention may be varied.

For floor coatings, a quantity of 1 to 75% (preferably 5–40%) glass granulate per ton of concrete, relative to the dry substance, has proved to be especially advantageous.

Further, the construction-material body or coating according to the present invention may comprise other common agglutinants such as acrylate and/or epoxy resins or polyesters.

Suitable hydraulic agglutinants include for example cement and concrete.

In accordance with DIN 1045 (July 1988), the term "concrete" as used in the present invention refers to all construction materials being manufactured by hardening a mixture of cement, concrete aggregate and water and, if appropriate, concrete additive means and concrete additive substances. The glass granulate according to the present invention is suitable for use in concrete having any composition and consistency such as light concrete, normal concrete and heavy concrete, gas or foam concrete, flow concrete, stiff concrete, reinforced concrete and prestressed concrete.

The production and properties of concrete are widely known and described, for example, in Gutcho: "Cement and Mortar Technology and Additives", Park Ridge: Noyes, 1980 and in "Kirk-Othmer" ($3^{rd}$ edition) vol. 5, pp. 163–193.

The term "cement" as used in the present invention refers to any finely milled hydraulic agglutinants which, while taking in water, become stone-hard in air and in water and are water-resistant after curing. Cement types with a wide variety of hydraulic modules may be used.

Suitable cement types include Portland cement, iron Portland cement, blast furnace cement, track cement, Portland oil shale cement, track blast furnace cement, flue ash cement, phonolithic cement, volcanic cement, sulphate mill cement, alumina cement, alumina melt cement, expanding cement, deep-drill cement and fastcuring cement. Preferably, Portland cement is used. The production and properties of the individual cement types are widely known and described, i.a. in "Ullmanns Enzyklopädie der technischen Chemie" (Ullmann's Encyclopedia of Technical Chemistry) ($5^{th}$ edition) vol. 5, pp. 489–516.

All aggregate materials commonly used in the building industry such as brash, gravel, sand, slag, glass, and plastic materials are suitable. These are generally known to those skilled in the art and described, for example, in "Kirk-Othmer" ($3^{rd}$ edition) vol. 12, pp. 712–733, and "Ullmanns Enzyklopädie der technischen Chemie" (Ullmann's Encyclopedia of Technical Chemistry), ($4^{th}$ edition) vol. 13, pp.85–94.

Now, the manufacturing of the glass granulate to be used in the construction-material body or coating according to the present invention will be described in more detail with reference to an example embodiment:

15 kg of glass granulate made of alkali silicate glass having a mean particle size of 0–4 mm were filled into a drum mixer and mixed intensively at room temperature with a mixture of 0.45 kg duroplastic material (epoxy resin+ hardener) and 0.045 kg of an epoxy-corresponding silane. After homogeneous wetting of the glass granulate used, 0.1 kg of an inorganic dye powder was added at room temperature while intensively mixing. After the homogeneous distribution of the dye pigment, the substance was stirred at room temperature until the glass granulate showed no more stickiness. The glass granulate obtained had a coating thickness of approximately 150 µm, a Mohs' hardness (determined after 3 days) of approximately 6.0 and an attractive appearance characterised by strong gloss.

The term "glass granulate" refers to glass grains, pieces and particles of any origin or production, in particular glass bowls, sections of rovings, glass fibres, glass drops, fragments of larger glass bodies, etc.

The invention claimed is:

1. A concrete substrate containing a mixture of cement and aggregate materials, and glass granulate in the concrete substrate,
    wherein the surface of the glass granulate is coated with a protective layer obtained by pretreating the surface of the glass granulate with silane and then coating the silane pretreated glass granulate with at least one duroplastic material prior to incorporating the glass granulate coated with the protective layer into the mixture.

2. The concrete substrate according to claim 1, wherein the silane is a compound having the general formula $$Y-(CH_2)_n SiX_3$$

wherein X is a halogen atom selected from the group consisting of fluorine, chlorine, bromine and iodine or an alkoxy group comprising 1 to 20 carbon atoms, Y is an amino, carboxy, cyano, methacryloxy, epoxy, mercapto and an alkyl, aryl or aralkyl-substituted vinyl group, and n is a number from 0 to 30.

3. The concrete substrate according to claim 2, wherein n is a number from 0 to 10.

4. The concrete substrate according to claim 1, wherein the duroplastic material is selected from the group consisting of a diallylphthalate resin, epoxy resin, urea-formaldehyde resin, melamine-fomaldehyde resin, melamine-phenol-formaldehyde resin, phenol-formaldehyde resin and an unsaturated polyester resin.

5. The concrete substrate according to claim 4, wherein the epoxy resin is an epoxy resin varnish based an bisphenol-A.

6. The concrete substrate according to claim 1, wherein the glass granulate consists essentially of clear glass and wherein the protective layer is coloured in a transparent to opaque manner.

7. The concrete substrate according to claim 1, wherein the glass granulate contains recycled glass.

8. The concrete substrate according to claim 1, wherein the glass granulate has a mean diameter ranging from 0.5 to 64 mm.

9. The concrete substrate according to claim 1, wherein the protective layer of the glass granulate has been removed at least in part in the exposed surface areas of the concrete substrate.

10. The concrete substrate according to claim 9, wherein the protective layer contains agglutinants.

11. The concrete substrate according to claim 1, wherein the concrete substrate is ground or sandblasted on at least one of its visible sides.

12. The concrete substrate according to claim 1, wherein the glass granulate consists of clear glass.

13. The concrete substrate according to claim 12, wherein the protective layer is coloured in a transparent to opaque manner.

14. A method for manufacturing a concrete substrate, comprising the steps of:
    treating the surface of a glass granulate with silane;
    coating the silane pretreated glass granulate with at least one duroplastic material, to obtain glass granulates coated with a protective layer;
    preparing a mixture of cement, and aggregate materials and the glass granulate coated with the protective layer;
    applying the mixture onto a surface or into a mold; and
    curing the mixture to form a concrete substrate.

15. A method according to claim 14, further comprising one of sandblasting or grinding of at least one visible side of the concrete substrate as procedural step.

16. The concrete substrate according to claim 1, wherein the glass granulate has a mean diameter ranging from 1 to 32 mm.

17. The concrete substrate according to claim 1, wherein the protective layer contains acrylate and/or epoxy resins as agglutinants.

* * * * *